US 7,023,814 B2

(12) United States Patent
Kotzin

(10) Patent No.: US 7,023,814 B2
(45) Date of Patent: Apr. 4, 2006

(54) METHOD AND APPARATUS FOR DISTRIBUTING INFORMATION

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 85 days.

(21) Appl. No.: 10/449,263

(22) Filed: May 30, 2003

(65) Prior Publication Data

US 2004/0240403 A1 Dec. 2, 2004

(51) Int. Cl.
*H04H 1/00* (2006.01)
(52) U.S. Cl. .................. 370/312; 370/310.2; 370/315; 370/329; 370/330; 370/331; 370/332; 370/335; 370/336; 370/338; 370/401
(58) Field of Classification Search ............... 370/338, 370/349, 310, 312, 315, 401, 310.2, 329, 370/330, 331, 332, 335, 336
See application file for complete search history.

(56) References Cited

U.S. PATENT DOCUMENTS

| 5,673,252 | A | * | 9/1997 | Johnson et al. ............. 370/449 |
| 5,726,984 | A | * | 3/1998 | Kubler et al. ................ 370/349 |
| 6,434,159 | B1 | * | 8/2002 | Woodward et al. ......... 370/401 |
| 2002/0071416 | A1 | * | 6/2002 | Carlson et al. |
| 2002/0122410 | A1 | * | 9/2002 | Kulikov et al. |
| 2002/0169539 | A1 | * | 11/2002 | Menard et al. ............. 701/200 |
| 2005/0020275 | A1 | * | 1/2005 | Agrawala et al. ........ 455/456.1 |

* cited by examiner

*Primary Examiner*—Ricky Q. Ngo
*Assistant Examiner*—Kevin Mew
(74) *Attorney, Agent, or Firm*—Charles W. Bethards

(57) ABSTRACT

A communication unit, system, and corresponding method are arranged for distributing information. The communications unit comprises: a receiver to receive a message originating from an information source for distribution to one or more target communications units; a controller coupled to a memory to store the information in the memory; and a transmitter having short range communications capabilities to transmit the information to individual communications units to facilitate distribution to the one or more target communications units on an opportunistic basis.

34 Claims, 4 Drawing Sheets

METHOD AND APPARATUS FOR DISTRIBUTING INFORMATION

FIELD OF THE INVENTION

This invention relates in general to communication systems and services, and more specifically to a method and apparatus for distributing information to communications units using such systems.

BACKGROUND OF THE INVENTION

Communications systems such as cellular telephone systems or messaging systems or other wide area networks (WANs) suitable for providing communications services and the corresponding communications units or subscriber devices providing data and voice services for operating therein are known. Typically the charges or tariffs for these services are related to the extent, such as time or total traffic or the like that the services are used. When an individual has common information to deliver to a multiplicity of target consumers or units, contacting each unit and delivering the information can be become prohibitively expensive.

Wireless local area networks (W-LANs) are beginning to be deployed and it is expected that most users will have one or more devices with W-LAN capabilities in the near future. However coverage is so limited in such W-LANs that assuring that a multiplicity of target consumers gets a general broadcast is difficult. Furthermore a general broadcast to a group of consumers or target units on a developed W-LAN can be as expensive as a broadcast over a WAN. Clearly a need exists for methods and apparatus to distribute information to an audience, preferably in a cost effective manner.

BRIEF SUMMARY OF THE INVENTION

The present invention concerns, systems, communications units, and methods of distributing information to or among communications units on an opportunistic basis. In one aspect a method includes receiving at a communications unit information originated from an information source, where the information includes one or more messages for distribution to one or more target communications units. In some embodiments the information is received at a carrier communications unit that is precluded from accessing the information. The method further includes, forwarding, from the communications unit, the information to individual communications units to facilitate distribution to the one or more target communications units on an opportunistic basis using short range communications capabilities of the communications unit.

In another aspect in accordance with the invention, a communications unit is arranged and constructed for distributing information and includes a receiver to receive a message originating from an information source, the message including information for distribution to one or more target communications units. In some embodiments, the message comprises a time frame for forwarding the information to a portion of the one or more target communications units. Further includes is a controller, coupled to the receiver and a memory, to store the information in the memory; and a transmitter having short range communications capabilities and cooperatively operating with the controller to transmit the information to individual communications units to facilitate distribution to the one or more target communications units on an opportunistic basis.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
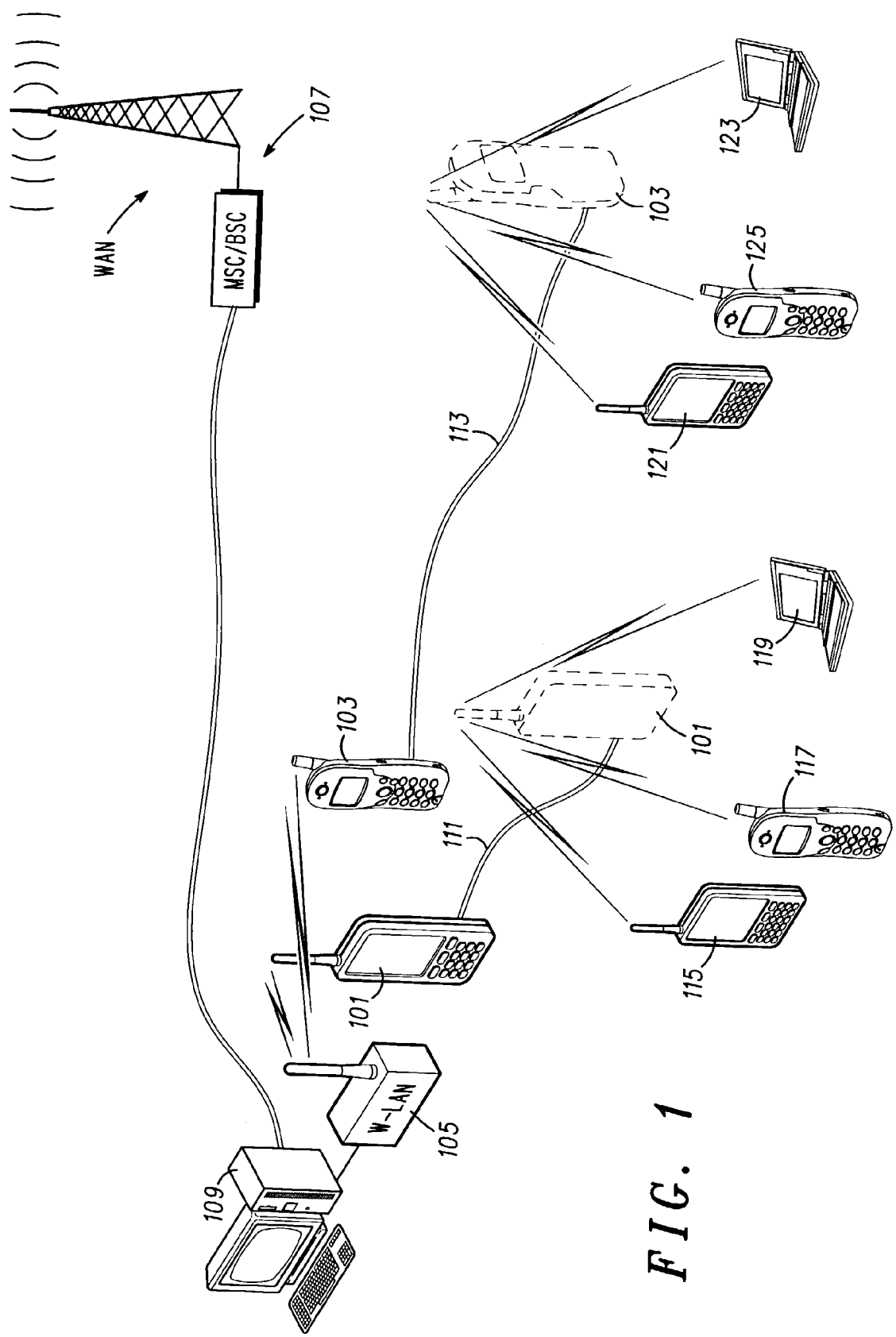
FIG. 1 depicts, in a simplified and representative form, a communications system and communications units suitable for implementing one or more methods of distributing information.

In overview, the present disclosure concerns communications systems that provide services such as voice and data communications services to wireless communications devices or units, often referred to as subscriber devices, such as cellular phones or two-way radios and the like operating therein or specifically users of such services and units. More particularly various inventive concepts and principles embodied in systems, communications units, and methods therein for providing, initiating, or facilitating information distribution to one or more target communications units are discussed and described. Note that the wireless communications units for providing or facilitating information distribution to other communications units as well as the other units can be a variety of devices, such as a personal digital assistant, personal assignment pads, and personal computers equipped for wireless operation, a cellular handset or device, or equivalents thereof provided such units are arranged and constructed for operation in wireless local area networks (W-LANs).

The communications systems and communications units that are of particular interest are those that may provide or facilitate voice communications services or data or messaging services over wide area networks (WANs), such as conventional two way systems and devices, various cellular phone systems including analog and digital cellular, CDMA (code division multiple access) and variants thereof, GSM, GPRS (General Packet Radio System), 2.5 G and 3G systems such as UMTS (Universal Mobile Telecommunication Service) systems, integrated digital enhanced networks and variants or evolutions thereof. Furthermore the wireless communications units or devices of interest have short range communications capability normally referred to as W-LAN capabilities, such as IEEE 802.11, Bluetooth, or Hiper-Lan and the like that preferably utilize CDMA, frequency hopping, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below various inventive principles and combinations thereof are advantageously employed to initiate an information distribution by seeding the distribution process by transferring the information to a few communications units and then letting these units further distribute the information to one or more additional layers of communications units until the target units have been provided the information. In this manner information can be distributed to a large number of users or user communication units at little or no cost, thus alleviating the economic issues that can be associated with known broadcast approaches that rely on an infrastructure for the distribution while still facilitating information services for most users even for time sensitive information provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative communications system and communications units suitable for implementing one or more methods of distributing information will be discussed and described. FIG. 1 shows wireless communications units 101, 103, or communications or subscriber devices, such as personal digital assistants or cellular handsets coupled via radio signals to a W-LAN access network or access point 105 (W-LAN 105) and possible to a WAN radio access network 107 (WAN 107), such as a mobile phone or cellular system. The W-LAN 105 is preferably an IEEE 802.11 access point but may also be a Bluetooth or other short range wireless connection, that is further coupled, via for example a wired LAN or WAN, to one or more computers or the like with one computer 109 depicted. The WAN 107 includes or is coupled to a mobile switch that is further coupled to the PSTN (public switched telephone system or the like) or public switched data network, such as the Internet or World Wide Web and from there to the computer 109. These networks can serve a multiplicity of communications units. Generally the W-LAN and WAN systems are known to one of ordinary skill and will not be further described in any detail, apart from the necessities with respect to the preferred embodiments.

The communications units 101, 103 are also generally known other than the modifications and improvements disclosed herein. Thus the known functions and structure of such devices will not be described in detail other than as related to the inventive principles and concepts disclosed and discussed below. These units 101, 103, as depicted, are within range of the W-LAN access point 105 and thus communications may be conducted between the access point 105 and communications units 101, 103 on an opportunistic basis so long as they are proximate to or within range of the access point. As the wireless communications units 101, 103 move along their respective paths 111, 113 they will likely go outside the range of the W-LAN access point 105 and each will encounter or become proximate to wireless communications units or communications units with W-LAN capabilities.

For example as depicted, communications unit 101 travels to a new location where it is proximate to communications units 115, 117, 119, depicted as a PDA, cellular handset, and laptop or tablet computer, respectively. Similarly as communications unit 103 traverses its path 113 to a new location, it becomes proximate to other communications units 121, 123, 125, depicted as a PDA, tablet computer, and handset, respectively. As communications units 101, 103 continue with their normal activities they will likely encounter or become proximate to additional communications units (not depicted). Furthermore as the other communications units 115–125 go about their normal activities they will in all likelihood encounter more communications units.

Thus, if a user of computer 109 wishes to distribute information to one or more target communications units, the information can be sent to communications units 101 or 103 via the W-LAN access point when the opportunity is presented, and then passed on to other communications units and from there to still more units as the opportunity presents itself. In this manner a broadcast from the WAN 107 or from a multitude of W-LAN access points and corresponding costs can be avoided. Note that the initiation of the distribution can still be through the WAN but in that case to a very limited audience, such as communications unit 101 or 103, assuming these units have WAN capabilities, with the bulk of the distribution being handled on a peer to peer basis via the W-LAN capabilities.

This procedure may not work well for time critical information, such as severe weather warnings or mass meeting in ten minutes, but should operate for time sensitive or insensitive applications with time horizons on the order of hours for example. The principles and concepts can also be applied to more limited applications, such as passing a message through a unit with an employee to another unit with the employee's boss or sending a message to the parents using the communications unit carried by the child, both based on the premise that the employee and child are likely to encounter the boss and parent, respectively.

Figure 2:
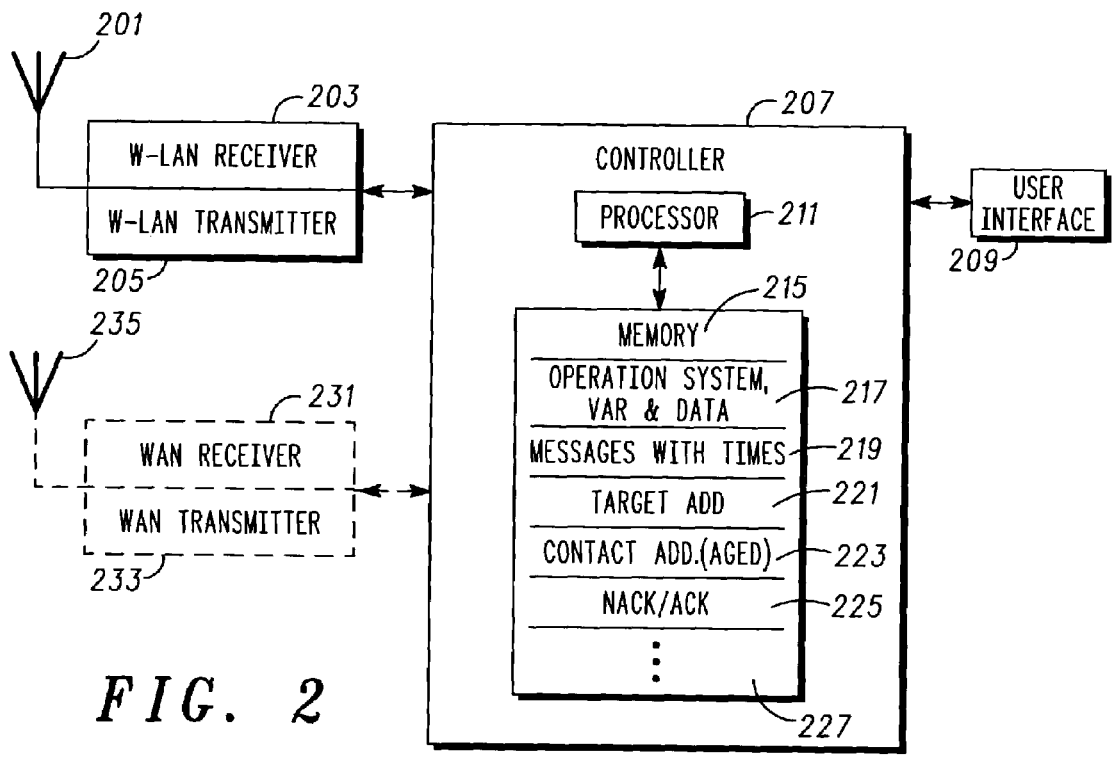
FIG. 2 depicts a block diagram of a preferred embodiment of a communications unit arranged for facilitating information distribution to or from other communication units.

Referring to FIG. 2 a block diagram of a preferred embodiment of a communications unit, such as any one of the devices 101, 103, 115–125, arranged for facilitating information distribution to or from other communication units will be discussed and described. The communications unit is arranged and constructed for distributing information or messages to other communications units. Note that the specific functionality of portions, functional blocks or elements of the communications unit or device will depend on the particular access technology and other conventions used by the network providers. These specifics of transmission and reception and relevant processing are known and therefore any further discussions will be in generalities that are applicable to typical communications systems.

The communications device includes an antenna 201 that operates to absorb and radiate radio frequency signals that are received by a receiver 203 or transmitted or sent from a transmitter 205 as is known. The receiver 203 and transmitter 205 are short range W-LAN type of elements suitable for effecting an 802.11 CDMA connection or Bluetooth frequency hopping spread spectrum connection or the like or some combination of multiple such interfaces or air interface connections. The receiver 203 provides a base band signal that is coupled to a controller 207 for further processing, such as call and audio or message processing. The transmitter 205 is also coupled to the controller 207 and the controller 207 operates to generate base band messages and so on, as known, to prepare uplink signals for amplification and transmission by the transmitter 205.

The controller 207 is coupled to a user interface 209 that includes, for example, audio transducers, such as an earpiece or speaker and microphone, display, and keypad. The transmitter 205, receiver 203, and user interface 209 are each inter-coupled, as depicted, to the controller 207 and the controller 207 provides overall operational command and control for the communications device. The controller 207 is coupled to and operates together with the display and keyboard or set of keys to effect a portion of a user interface experience that may depend on the particular device and its features and to facilitate generation and consumption of messages or other information. The keyboard can be a known physical keyboard or virtual keyboard that is part of the display and the display is also known and can be a liquid crystal display or the like. When the keys are part of a virtual keyboard the display will be composed of touch sensitive material or the like in order to convey information to the controller 207.

The controller 207 includes a processor 211 that is, preferably, a known microprocessor based element that is widely available and can include one or more microprocessors and one or more digital signal processors depending on the precise responsibilities of the controller 207 with respect to signaling duties and call processing that are not here relevant. The processor 211 can be coupled to a port not shown that allows an external device, such as a portable computer or the like to interface to the communications device and thus become, for example, a part of the user interface 209 or a diagnostic and testing apparatus.

In any event the processor 211 is also coupled to a memory 215 that can be, for example, a combination of known RAM (Random Access Memory), ROM (Read-Only Memory), EEPROM (Electrically Erasable Programmable ROM) or magnetic memory that among other items, such as messages and folders with messages, address books, standard or canned messages, and various operating variables and parameters will store an operating system or software 217 for the processor. This operating software when executed by the processor 211 will result in the processor 211 performing the requisite functions of the communications device such as interfacing with the transceiver or transmitter 205, receiver 203, and user interface 209 including display and keyboard, audio processing functions and so on including other functional elements not depicted and software routines that will be further described below. The memory 215 further includes call processing routines not specifically shown for supporting voice and data calls that will be appreciated by one of ordinary skill and that will vary depending on air interface, call processing, and service provider or network specifics.

As depicted, the memory 215 further includes space for one or more messages 219 including delivery constraints such as time limits, either earliest or latest limits for example. Further included in a cross referenced manner is target communications unit addresses 221 indicating what communications units the messages are intended to be delivered or distributed to. Additionally a database and management routines 223 for storing contact addresses that are preferably aged is included in the memory 215. This information can be provided to other communications units upon request or used by the communications unit to determine what other communications units are likely to be encountered in what time frame or period.

For example, suppose the last three contacts and time of the contact is retained for each communications unit or contact address. A communications unit that has been contacted every two hours over the last six or eight hours is a unit that is likely to be contacted again over the next 24 hours. A communications unit that has been contacted once every two days is not likely to be contacted over the next 24 hours. In addition there are acknowledgement or negative acknowledgment routines that may be utilized if desired to send an ACK or NACK to the originator of information as appropriate. The reader or one of ordinary skill will appreciate that this listing is merely a brief listing of exemplary routines that will be required or advantageous in effecting a communications device for controlled services and various command and control duties and that many others 227 including optional applications that can be stored in the memory have not been mentioned. Further depicted is a WAN receiver 231 and transmitter 233, each coupled to an antenna 235 that may be physically separate from or included with the antenna 201. The Wan receiver and transmitter are known elements that together with the controller 207 are used to support a connection with the WAN 107.

The following discussion will focus on the operational interactions and refer to the FIG. 2 depiction of a communications unit that can originate information or messages for distribution, operate simply as a carrier of the information, operate or be a target for the information, or operate as a combination of carrier and target unit. The communications unit, as noted above, is arranged and constructed for distributing information and comprises a receiver to receive a message initiated by or originating from an information source where the message includes information, such as addresses or group addresses for distribution to one or more target communications units. Note that the message can be received directly from the information source such as the computer 109 via either the W-LAN access point 105 or the WAN 107 assuming the communications unit has the appropriate receivers and capabilities. The message or information can also be received indirectly from the information source, specifically from an intervening communications unit that received and forwarded the message.

Further included is the controller 207 that is coupled to the appropriate receiver and the memory 215, in order to store the message or appropriate information in the memory at 219. Additionally included is the transmitter 205 having short range or W-LAN communications capabilities and cooperatively operating with the controller to transmit the information to individual or other communications units that can be used to facilitate distribution to the one or more target communications units on an opportunistic basis.

When the communications unit is only a carrier communications unit it may be appropriate to preclude disclosing the information to a user of the communications unit. For example, a message or information intended for the parent or boss probably should not be disclosed to the child or employee. However, the communications unit can be one of the one or more target communications units and the user interface 209 can be used for presenting the information to the user of the communications unit in this case. As suggested above the receiver can be the receiver 203 using short range or W-LAN communications capabilities to receive the message when or while proximate to the information source, such as the W-LAN access point 205. Alternatively the receiver can be the receiver 231 having WAN communications capabilities that are used to receive the message.

The information source or originator can rely on happenstance or serendipity for message or information distribution when all members of a population or a readily defined subgroup such as engineering or junior class with a corresponding group ID or address should receive the message and it is nearly certain that all or most of the members or target communications units will receive the message. In other instances it is more appropriate for the message that is received to identify the one or more target communications units. The one or more target communications units can be identified when the message includes an address for a target communications unit or a group address or ID for a plurality of target communications units. Note also that the message that is received may need to include the address for a communications unit that is simply a carrier unit that the message needs to be forwarded to.

The communications unit can facilitate providing the proper addresses by maintaining the database 223 having data indicative of other communications units that have been contacted, e.g. that are possible target communications units. This database can also include data indicative of the likelihood, such as times of contacts and frequencies of contacts, that the other communications units will be accessible within a time frame or desired time frame to transmit the information to the other communications units. As noted above information regarding the last few contacts and associated times of such contacts with a particular communications unit can assist with this determination. Of course this data must be accessible to the information source in order to make a determination of whether the communications unit is likely to be proximate to a target communications unit of the one or more target communications units within the desired time frame. This data can be made available upon demand from another communications unit or made available voluntarily when the communications unit is proximate to likely information sources, such as other communications units or the W-LAN access point, e.g. computer. Note that a particular communications unit can be charged with forwarding the information or message to portion of the target communications units, although there may well be overlap in these assignments. Furthermore when a target communications unit has received the message there is no need to forward it a second or third time and if it is forwarded the target unit can discard the message using message IDs as is known. Also in addition to the proper target units there can be other distribution or delivery constraints, such as an earliest and latest time frame for delivery or forwarding of the message or information to the target communications units.

If the communications unit is unable to forward the message or information within the time frame and if desired the transmitter 233, when available, in cooperation with the controller 207 can report a message failure to the information source. Alternative ways of assuring that target units obtain the proper information is to have target units send an acknowledgment message once the information is received. If he ACK is not received the information source can use the WAN to directly send the information to the target unit. If the information is a scheduled delivery, such as Tuesday's newsletter or the like, a target unit that does not receive the newsletter by 4 PM for example can use the WAN and request a copy.

Figure 3:
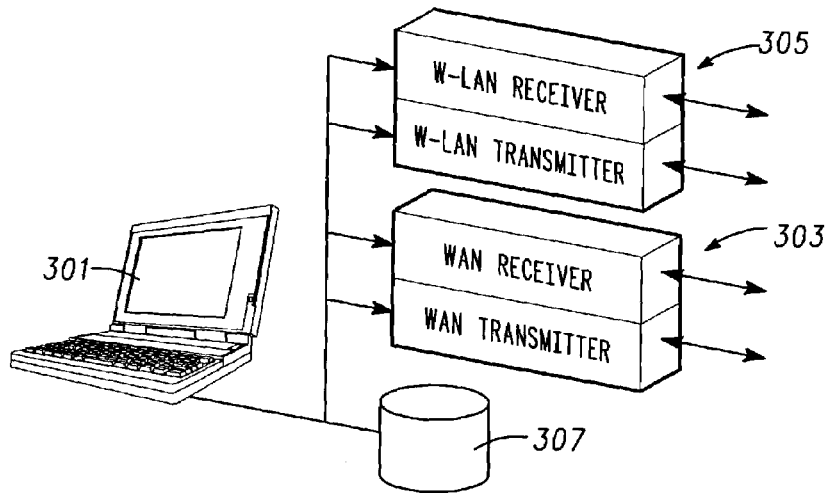
FIG. 3 depicts a diagram of one embodiment of a system for distributing information.

Referring to FIG. 3, a diagram of one embodiment of a system for distributing information will be discussed and described. The system is for distributing information to a target audience, and comprises a message source 301, such as the computer 109 keyboard to provide a message for distribution to one or more target communications units; a database 307, for example on a hard drive and including a cross reference 309 between individual communications units (unit ID) and other communications units (contacted units) that the individual communications unit has a history (contacted date/time) of being able to establish short range communications with.

Further included is a controller or processor (part of the computer 109), coupled to the message source and the database, for selecting one or more of the individual communications units that may be utilized to facilitate distribution of the message to the one or more target communications units. Additionally included is a transceiver (WAN T/R 303 or LAN T/R 305) for transmitting the message to the one or more individual communications units, where the message preferably further includes an address or group address or group ID of or corresponding to each or a portion of the one or more target communications units.

The system can select or utilize the most effective approach for information distribution or initiating such distribution. For example the system can use the transceiver 305 having LAN or short range communications capabilities and transmit the message to each of or some of the one or more individual communications units using the short range communications capabilities when one or more individual communications units are within range of the LAN transceiver 305. The system can use the WAN transceiver 303 including wide area network capabilities and transmit the message, using the wide area network capabilities, to each or a portion of the one or more individual communications units for subsequent forwarding to other communications units and ultimately the one or more target communications units.

As the system contacts or connects with each communications unit as part of a message distribution or simply because the unit is proximate or otherwise in contact with the system, the transceiver obtains and the controller updates the database with any cross reference data provided by the each of the one or more individual communications units. In this manner the database can be maintained with more or less up to date information. Note that communications units, provided they have sufficient memory, can also keep this or a similar database and also operate to distribute information as herein discussed. Furthermore the one or more individual communications units that the message is sent to can be target units or only carrier units where the carrier units simply forward the message to other communications units, with, when preferred, the carrier units precluding access to the message by the user of that carrier unit.

The system also can implement or utilize one or more forms of assurance that information has been distributed to the appropriate target communications units. For example, the transceiver and usually the WAN transceiver can receive a message failure indication from one of the each of the one or more individual communications units when the message or information could not be forwarded from that unit to a target communications unit within a prescribed time frame or according to some other distribution limitation. In this instance the system can use the WAN transceiver and, responsive to the message failure and cooperatively with the controller uses the wide area network capabilities to forward the message to the target communications unit. Alternatively the likely WAN transceiver receives an acknowledgement from one of the one or more target communications units when the one or more target communications units have received the message. If an acknowledgment is not received, the system can forward via the WAN transceiver the message to any target units that have not acknowledged.

Generally the message source, specifically a user thereof enters a message or information or manipulates a file that the user wishes to distribute. The user also specifies target units via an address or group address or ID. Again the user can rely on serendipity and send the message or information on an opportunistic basis to whatever communications units come into proximity with the system or specifically as communications units pass by the LAN T/R 305 together with a list of addresses for target units or remaining target units. Alternatively the database can be used as follows. Given a list of target communications unit the controller looks for these units in the contacted units section of the database. Note that an entry in the table under unit ID indicates that the system has been in contact with the particular unit at some time and this time can also be included in the database.

For example, suppose units C, F, and G are target communications units. The controller determines using the cross reference information 311 that units C and G have been contacted by communications unit A, from 313 that units C, F, and G have been contacted by unit B, and from 315 that unit C has been contacted directly. The numbers under the heading contacted DATE/TIME are merely representative and indicative of when the contact occurred with lower numbers being a more recent contact and with the numbers corresponding respectively to the contacted units indicated in the next column to the left. Thus from 311 unit A contacted units C, G at a DATE/TIME indicated by 1, 5 respectively. Similarly unit B contacted C, F, G at 3, 1, 1 respectively.

One distribution strategy that may be adopted from these observations is to select unit A for delivery of the message to unit C and unit B for delivery to units F and G as this represents using units with more recent contacts with the target units. The system may also seek to use a direct delivery to unit C since there is a history of a contact with that unit. Note that this database is merely a simplified example used for the purpose of explaining one scenario. An actual database would be much more comprehensive and include a more extensive history of contacts between communications units and thus be much more reliable for use in determining a distribution strategy. Note also that a user or system determining a distribution strategy will have many options and in fact can select multiple possible delivery paths for any one target unit where the number of possibilities may depend on the urgency or importance of the delivery being successful as well as other factors.

Figure 4:
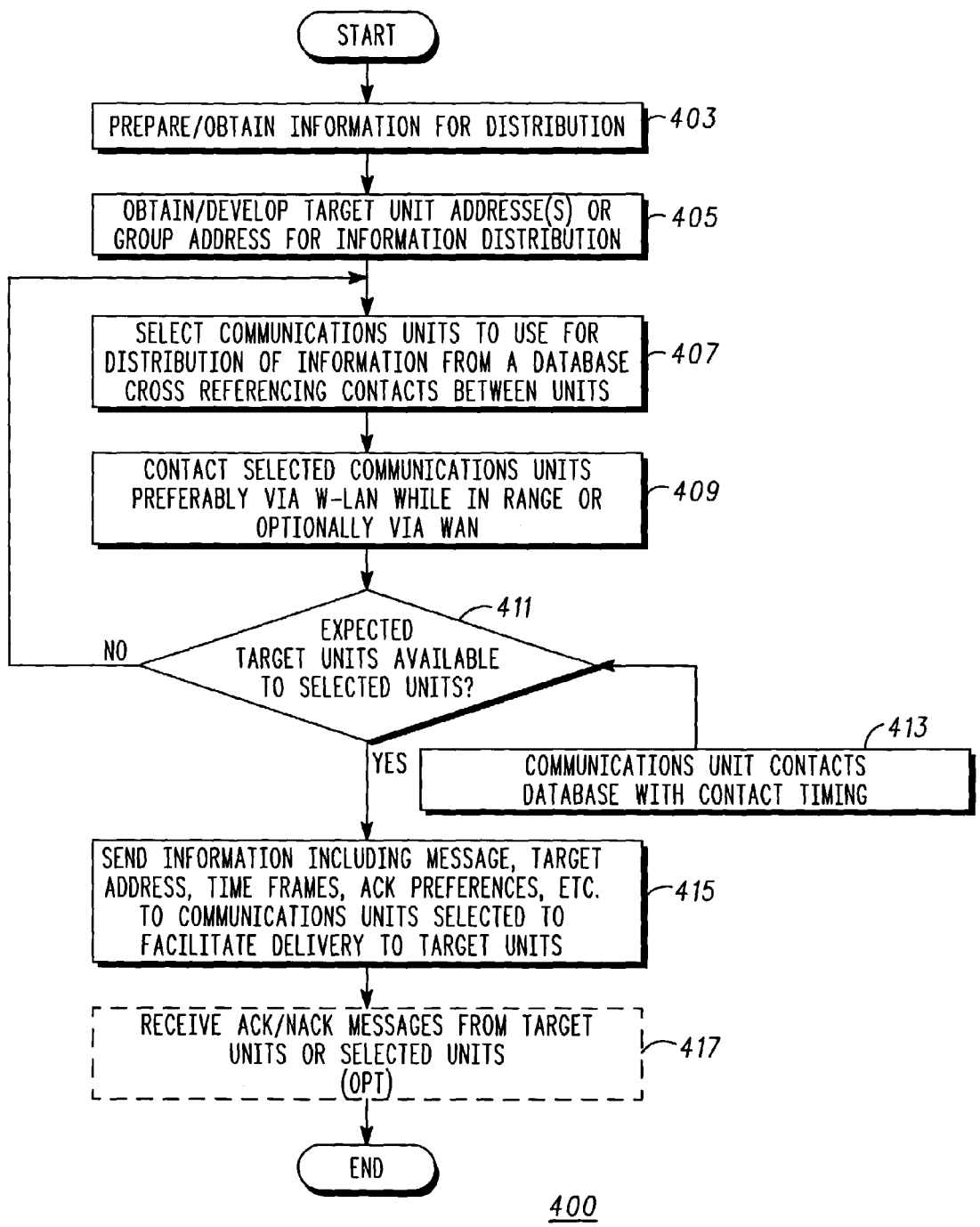
FIG. 4 shows a flow of a preferred method of initiating information distribution.

Referring now to FIG. 4, a flow of a preferred method of initiating information distribution will be reviewed and discussed. Some of this discussion will be in the nature of a review and summary of portions of the discussions above.

The method 400 begins at 403 where information for distribution is prepared or otherwise obtained. Then at 405, target unit addresses or group addresses for target units are obtained, developed, or selected for the units that the information will be distributed to.

Next at 407, selection of communications units to be used for distributing the information is undertaken. These units are selected from a database that cross-references contacts between units. At 409 the communications units that have been selected to facilitate the distribution are contacted, preferably via a W-LAN or optionally via a WAN system. At 411 it is determined whether the target units that are expected to be available to each of the selected communications units appear to be available. This process is accomplished by checking the present contact data 413, unit ID and timing, that is stored at each communications unit against the data from the database that was used to select the unit to begin with. If the target units do not appear to be available as expected the method returns to 407 for selection of a different or additional communications unit to be used for distribution and the procedures at 409 and 411 are repeated for such units.

Once all target units appear to be available to one or more of the selected units, 415 shows sending information including messages, target addresses, time frames for delivery, ACK preferences, etc to communications units that have been selected to facilitate delivery or distribution of the information to the target units. Optionally at 417, ACK or NACK indications or messages can be received from, respectively, target units that successfully received the information or message or selected communications units that were not successful or even target units that have not received an expected distribution in the expected time frame.

Figure 5:
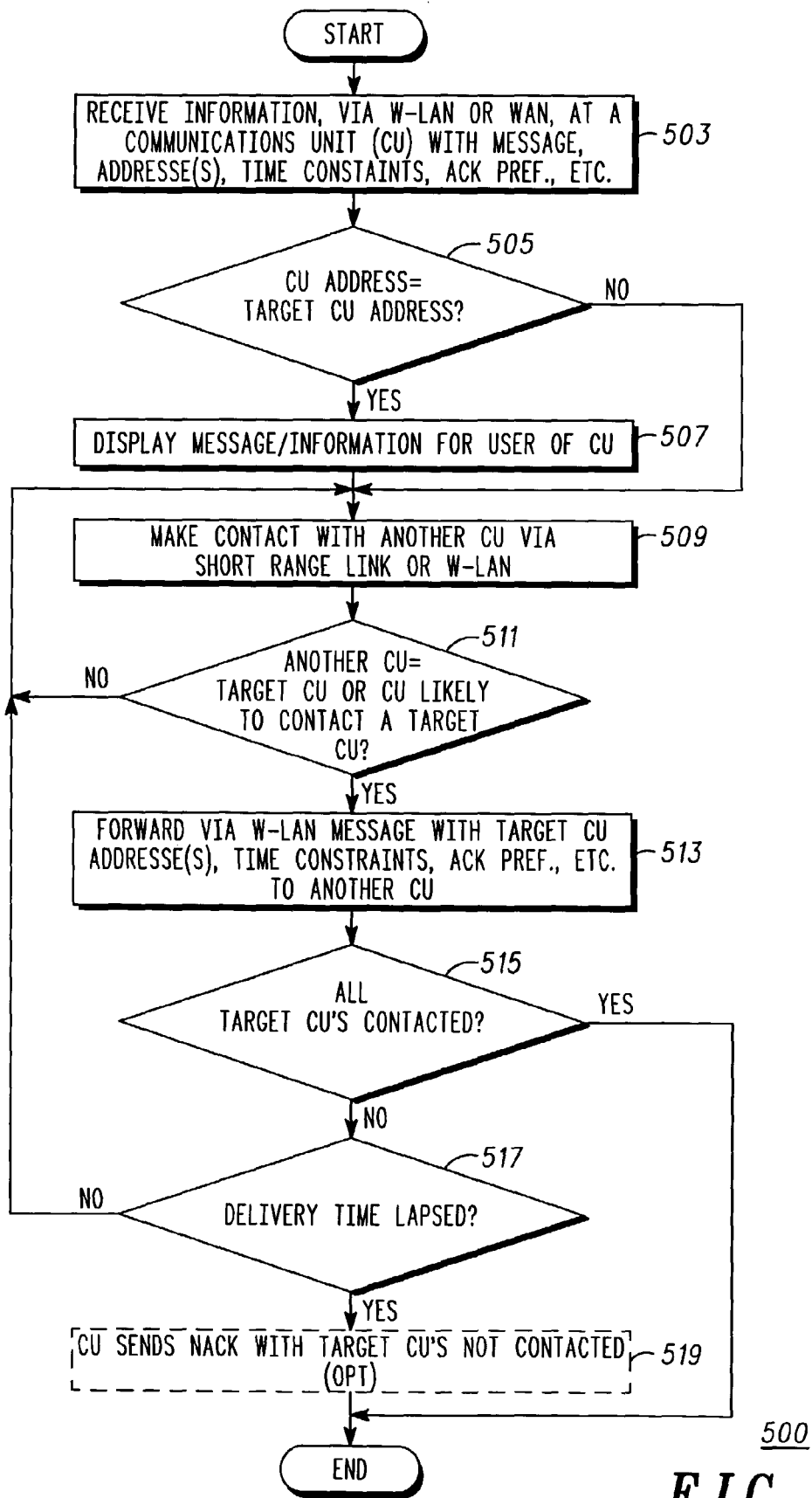
FIG. 5 illustrates a flow chart of a preferred method of facilitating information distribution.

Referring to FIG. 5, a flow chart of a preferred method of facilitating information distribution will be discussed and described. Some of the discussion below is a repeat of earlier material and will be presented in summary form. The method 500 begins at 503 and is a method of distributing information from or via a communications unit and thus is for implementation in the communications unit of FIG. 2. At 503 the method shows receiving via W-LAN or optionally WAN systems at a communications unit, information from an information source, where the information is for distribution to one or more target communications units. Thus the information includes messages, target unit addresses or group addresses, time constraints, ACK preferences, etc. The 505 determines whether the communications unit (CU) that received the information is one of the target CUs by comparing addresses and if so 507 indicates displaying or otherwise making the message/information available to the user of the communications unit.

If the communications unit is not one of the target communications units, e.g. it is a carrier unit the information that has been received is precluded from being accessed by the user of that unit. If it is a target unit and also a unit that will forward the information then after 507, the process at 509 shows contacting another communications units using a short range link or normal W-LAN capabilities and the known discovery procedures for such W-LAN technologies. Then 511, determines whether the CU that has been contacted is one of the target CUs or a CU that is likely to be in contact with a target CU. This can include determining that the communications unit is likely to be proximate to a target communications unit of the one or more target communications units. This determination can be made or aided by checking a database of contacted communications units corresponding to the communications unit, where the database of contacted communications units further preferably comprises contact times and dates and frequencies and the like.

If not, the method returns to 509 where additional CUs are contacted. If so, then 513 shows forwarding, from the communications unit, the information to the communications unit that is one of or one that will facilitate distribution to one of the one or more target communications units. This forwarding process is accomplished on an opportunistic basis using short range communications capabilities of the communications unit and the information that is forwarded will include target CU addresses, and other delivery or distribution constraints and preferences.

At 515 is it determined whether all target CUs have been contacted where this determination is necessarily unit specific in that a particular communications unit is likely to have been provided a list of target units that it is attempting to forward the information or message to. If all target CUs have not been contacted, 517 determines whether the time for delivering the messages or other information has lapsed. If not the process returns to 5098 and repeats from there. If all target CUs or assigned target CUs have been contacted the process ends. If the delivery time has lapsed and not all target CUs have been contacted, 519 shows an optional NACK or message failure message, including IDs or addresses for units not contacted being optionally sent to the originator of the information or message for distribution and then the method ends.

Other attributes of information distribution can be accommodated within the above discussed systems and apparatus such as delivering secure information. For example secure information can be delivered by encrypting the information encrypted with a targets unit or users public key and then only the target unit with the private key will have access to the information.

The apparatus, processes, and systems discussed above and the inventive principles thereof are intended to and can alleviate problems caused by prior information distribution approaches. Using these principles of seeding the distribution by sending the messages or information to a small number of communications units and using them to further distribute the material will facilitate cost effective distribution in a manner that is effective, efficient and friendly thus contributing to user satisfaction. It is expected that one of ordinary skill given the above described principles, concepts and examples will be able to implement other alternative procedures that are communications device dependent and that will also offer additional quick and efficient procedures for distributing information. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of distributing information comprising:
receiving at a communications unit information originated from an information source, the information including one or more messages for distribution to one or more target communications units, the receiving the information further comprising receiving the information at a carrier communications unit that is precluded from accessing the one or more messages; and
forwarding, from the communications unit, the information to individual communications units to facilitate distribution to the one or more target communications units on an opportunistic basis regardless of present connectivity between the individual communications units and the one or more target communications units using short range communications capabilities of the communications unit.

2. The method of claim 1 wherein the receiving the information at the communications unit further comprises receiving the information at one communications unit of the one or more target communications units.

3. The method of claim 1 wherein the receiving the information at the communications unit further comprises receiving the information using the short range communications capabilities of the communications unit when proximate to the information source.

4. The method of claim 1 wherein the receiving the information at the communications unit further comprises receiving the information using wide area network communications capabilities of the communications unit.

5. The method of claim 1 wherein the receiving the information at the communications unit further comprises receiving a message identifying the one or more target communications units.

6. The method of claim 5 wherein the receiving a message identifying the one or more target communications units further comprises receiving one of an address for a target communications unit and a group address for a plurality of target communications units.

7. The method of claim 1 wherein the receiving the information at the communications unit further comprises receiving a time deadline for forwarding the information to the one or more target communications units.

8. The method of claim 7 further comprising, reporting a message failure to the information source from the communications until when the information has not been forwarded within the time deadline.

9. The method of claim 1 further comprising determining that the communications unit is likely to be proximate to a target communications unit of the one or more target communications units.

10. The method of claim 9 wherein the determining that the communications unit is likely to be proximate to a target communications unit further comprises checking a database of contacted communications units corresponding to the communications unit.

11. The method of claim 10 wherein the database of contacted communications units further comprises contact times.

12. A communications unit arranged and constructed for distributing information, the communications unit comprising:
a receiver to receive a message originating from an information source, the message including information for distribution to one or more target communications units, the message further comprising a time frame for forwarding the information to a portion of the one or more target communications units;
a controller, coupled to the receiver and a memory, to store the information in the memory; and
a transmitter having short range communications capabilities and cooperatively operating with the controller to transmit the information to individual communications units to facilitate distribution to the one or more target communications units on an opportunistic basis.

13. The communications unit of claim 12 further being a carrier communications unit that is precluded from disclosing the information to a user of the communications unit.

14. The communications unit of claim 12 further being one communications unit of the one or more target communications units and further comprising a user interface for presenting the information to a user of the communications unit.

15. The communications unit of claim 12 wherein the receiver further has short range communications capabilities that are used to receive the message when proximate to the information source.

16. The communications unit of claim 12 wherein the receiver further has wide area network communications capabilities that are used to receive the message.

17. The communications unit of claim 12 wherein the receiver receives the message, the message identifying the one or more target communications units.

18. The communications unit of claim 17 wherein the receiver receives the message identifying the one or more target communications units and the message further comprises one of an address for a target communications unit and a group address for a plurality of target communications units.

19. The communications unit of claim 12 wherein the transmitter in cooperation with the controller further reports a message failure to the information source when the information has, not been forwarded within the time frame.

20. The communications unit of claim 12 wherein the memory further comprises a database having data indicative of other communications units that are possible target communications units.

21. The communications unit of claim 20 wherein the database further includes data indicative of the likelihood that the other communications units will be accessible within a time frame to transmit the information to the other communications units.

22. The communications unit of claim 20 wherein the data is accessible to the information source for determining whether the communications unit is likely to be proximate to a target communications unit of the one or more target communications units.

23. A system for distributing information to a target audience, the system comprising:
a message source to provide a message for distribution to one or more target communications units and a group address for the one or more target communications units;
a database including a cross reference between individual communications units and other communications units that the individual communications units have a history of being but may not currently be able to establish short range communications with;
a controller, coupled to the message source and the database, for selecting one or more of the individual communications units, regardless of present connectivity, that may be utilized to facilitate distribution of the message to the one or more target communications units; and
a transceiver for transmitting the message to the one or more individual communications units.

24. The system of claim 23 wherein the transceiver has short range communications capabilities and transmits the message to each of the one or more individual communications units using the short range communications capabilities when the each of the one or more individual communications units is within range.

25. The system of claim 24 wherein the transceiver obtains and the controller updates the database with any cross reference data provided by the each of the one or more individual communications units.

26. The system of claim 24 wherein the transceiver transmit the message further including an address corresponding to at least one of the one or more target communications units.

27. The system of claim 24 wherein the transceiver further receives a message failure from one of the each of the one or more individual communications units when the message could not be forwarded to a target communications unit within a prescribed time frame.

28. The system of claim 27 wherein the transceiver includes wide area network capabilities and, responsive to the message failure and cooperatively with the controller uses the wide area network capabilities to forward the message to the target communications unit.

29. The system of claim 23 wherein the transceiver includes wide area network capabilities and transmits the message, using the wide area network capabilities, to an individual communications unit for forwarding to other target communications units.

30. The system of claim 23 wherein a portion of the one or more individual communications units are carrier units, the carrier units precluding access to the message by the user of the carrier unit.

31. The system of claim 23 wherein the transceiver receives an acknowledgement from one of the one or more target communications units when the message has been received by the one of the one or more target communications units.

32. A method of distributing information comprising:
receiving at a communications unit information originated from an information source, the information comprising messages for distribution to one or more target communications units and a group address for the one or more target communications units; and
forwarding, from the communications unit, the information to one or more individual communications units to facilitate distribution to the one or more target communications units on an opportunistic basis regardless of present connectivity between the one or more individual communications units and the one or more target communications units using short range communications capabilities of the communications unit.

33. A communications unit arranged and constructed for distributing information, the communications unit comprising:
a receiver to receive a message originating from an information source, the message including information for distribution to one or more target communications units;

a controller, coupled to the receiver and a memory, to store the information in the memory and to preclude disclosure of the information to a user of the communication device; and a transmitter having short range communications capabilities and cooperatively operating with the controller to transmit the information to individual communications units to facilitate distribution to the one or more target communications units on an opportunistic basis regardless of present connectivity between the one or more individual communications units and the one or more target communications units.

34. A system for distributing information to a target audience, the system comprising:

a message source to provide a message for distribution to one or more target communications units;

a database including a cross reference between individual communications units and other communications units that the individual communications unit has a history of being but may not currently be able to establish short range communications with;

a controller, coupled to the message source and the database, for selecting one or more of the individual communications units that may be utilized to facilitate distribution of the message to the one or more target communications units, a portion of the one or more individual communications units being carrier units that preclude access to the message by the user of the carrier unit; and a transceiver for transmitting the message to the one or more individual communications units.

* * * * *